US010613606B2

(12) United States Patent
Min

(10) Patent No.: US 10,613,606 B2
(45) Date of Patent: Apr. 7, 2020

(54) WIRELESS COMPONENT STATE BASED POWER MANAGEMENT

(71) Applicant: Intel Corporation, Santa Clara, CA (US)

(72) Inventor: Alexander W. Min, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 15/072,795

(22) Filed: Mar. 17, 2016

(65) Prior Publication Data

US 2017/0269668 A1 Sep. 21, 2017

(51) Int. Cl.
| | |
|---|---|
| *G06F 1/32* | (2019.01) |
| *G06F 1/3206* | (2019.01) |
| *G06F 9/455* | (2018.01) |
| *G06F 1/329* | (2019.01) |
| *G06F 1/3209* | (2019.01) |

(Continued)

(52) U.S. Cl.
CPC ............ *G06F 1/3206* (2013.01); *G06F 1/324* (2013.01); *G06F 1/329* (2013.01); *G06F 1/3209* (2013.01); *G06F 1/3296* (2013.01); *G06F 9/45533* (2013.01); *G06F 9/45558* (2013.01); *G06F 9/5094* (2013.01); *G06F 2009/4557* (2013.01); *G06F 2009/45591* (2013.01); *Y02D 10/126* (2018.01); *Y02D 10/172* (2018.01); *Y02D 10/22* (2018.01); *Y02D 10/24* (2018.01); *Y02D 10/26* (2018.01); *Y02D 10/28* (2018.01); *Y02D 10/36* (2018.01)

(58) Field of Classification Search
CPC .................. G06F 9/45533; G06F 9/45558
See application file for complete search history.

(56) References Cited

U.S. PATENT DOCUMENTS

| | | | |
|---|---|---|---|
| 2009/0077395 A1 | 3/2009 | Tsai | |
| 2010/0192149 A1* | 7/2010 | Lathrop | ................ G06F 1/3203 718/1 |

(Continued)

FOREIGN PATENT DOCUMENTS

| | | |
|---|---|---|
| KR | 10-2012-0012763 A | 2/2012 |
| WO | WO2015-196343 A1 | 12/2015 |

OTHER PUBLICATIONS

International Search Report and Written Opinion dated May 18, 2017 for International Application No. PCT/US2017/017245, 15 pages.

*Primary Examiner* — Albert Wang
(74) *Attorney, Agent, or Firm* — Schwabe, Williamson & Wyatt, P.C.

(57) ABSTRACT

Apparatuses, methods and storage medium associated with power management, are disclosed herein. In embodiments, an apparatus for computing may include one or more processors, with each processor having one or more processor cores; one or more wireless communication components; memory coupled with the one or more processors to host a plurality of virtual machines operated by the one or more processors; and a virtual machine monitor to be loaded into the memory and operated by the one or more processors to manage resource allocation to the virtual machines. The virtual machine monitor may include a power manager to manage power consumption of the apparatus, based at least in part on states of the wireless communication components. Other embodiments may be described and/or claimed.

25 Claims, 5 Drawing Sheets

(51) Int. Cl.
    *G06F 1/324*     (2019.01)
    *G06F 1/3296*    (2019.01)
    *G06F 9/50*      (2006.01)

(56) References Cited

U.S. PATENT DOCUMENTS

2012/0155873 A1    6/2012  Lee et al.
2014/0149752 A1    5/2014  Brock et al.
2016/0203012 A1*   7/2016  Dong .................. G06F 9/455
                                                    718/1

* cited by examiner

WIRELESS COMPONENT STATE BASED POWER MANAGEMENT

TECHNICAL FIELD

The present disclosure relates to the field of computing. More particularly, the present disclosure relates to managing power consumption of a computing apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Managing power consumption of a computing apparatus has gained increasing interest, especially for mobile, battery-powered, computing apparatus. Traditional power management techniques are typically CPU or processor centric, based e.g., on CPU utilization rate/profile.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
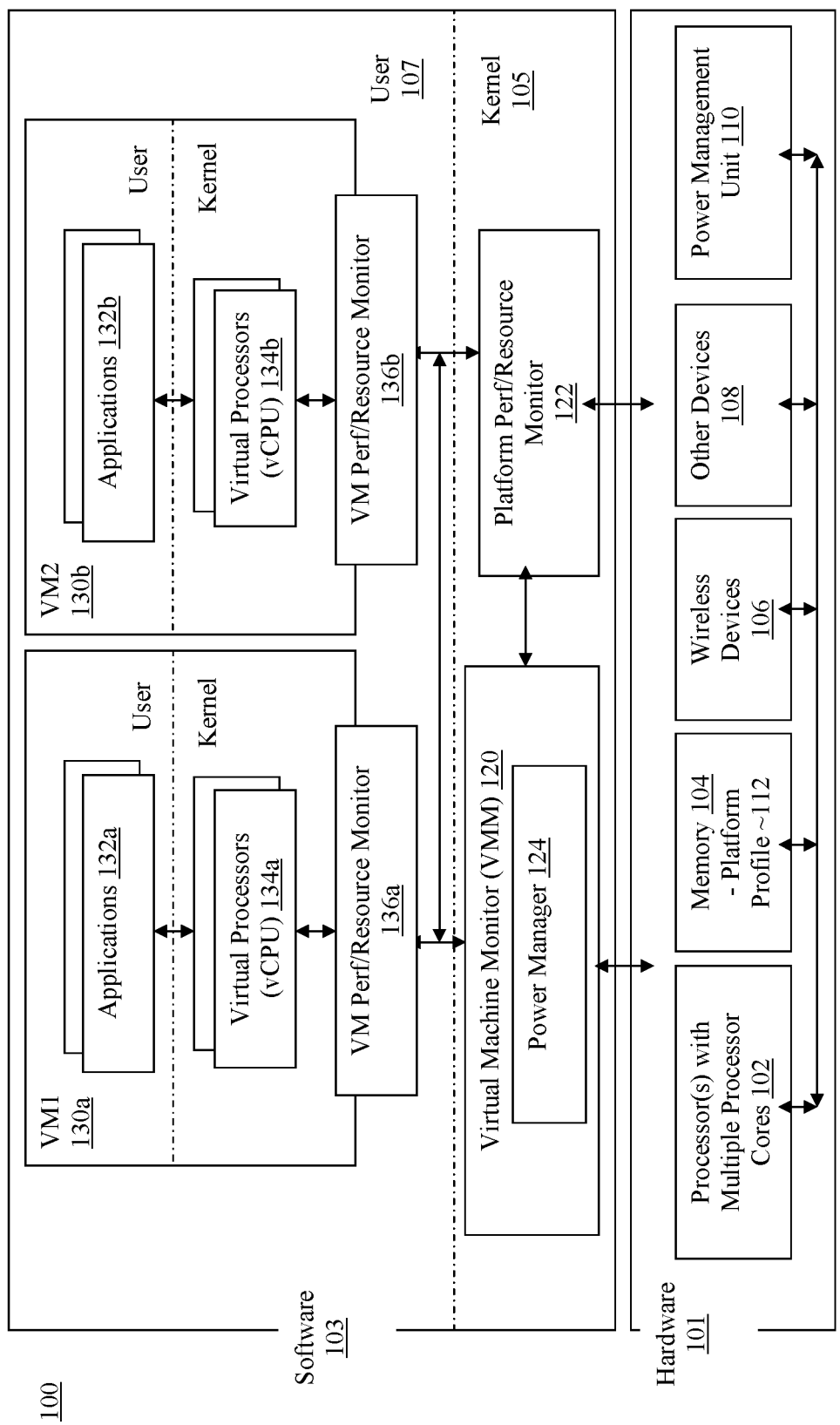
FIG. 1 illustrates a computing device having the wireless communication component state power management technology of the present disclosure, according to various embodiments.

Apparatuses, methods and storage medium associated with power management, are disclosed herein. In embodiments, an apparatus for computing may include one or more processors, with each processor having one or more processor cores; one or more wireless communication components; memory coupled with the one or more processors to host a plurality of virtual machines operated by the one or more processors; and a virtual machine monitor to be loaded into the memory and operated by the one or more processors to manage operation and resource allocation to the virtual machines. The virtual machine monitor may include a power manager to manage power consumption of the apparatus, based at least in part on states of the wireless communication components.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computing device having the wireless communication component state power management technology of the present disclosure, according to various embodiments, is shown. As illustrated, in embodiments, computing device 100 may include hardware 101 and software 103. Software 103 may include kernel 105 and user space 107. Kernel 105 may include virtual machine monitor (VMM) 120 configured to manage operation and resource allocation to virtual machines (VM), e.g., VM1 130*a*, VM2 130*b*, operating in user space 107. As will be described in more detailed below, VMM 120 may include power manager 124 configured to manage power consumption of apparatus 100, in particular, various components of hardware 101, based at least in part on states of the wireless communication components (hereinafter, simply "wireless components"). These and other aspects related to wireless component state power management will be further described below with references to FIGS. 2-4, after further description of FIG. 1.

In embodiments, hardware 101 may include processor(s) 102, memory 104, wireless devices 106, other devices 108 and power management unit (PMU) 110. Processor(s) 102 may be any one of a number of processors known in the art, having one or more processor cores. At least some of the one or more processor cores may be configured to support mapping to multiple virtual processors (vCPU) of VMs, e.g., vCPU 134*a* and 134*b* of VM 130*a* and 130*b*. Further, at least some of the one or more processor cores may be configured to operate in selected ones of less or more active states, e.g., an idle/sleep state and an active state, and/or different frequencies (consuming different amount of power while in the different states/frequencies). Memory 104 may be any known volatile or non-volatile memory in the art, suitable for storing data. Memory 104 may include a hierarchy of cache memory and system memory. Both the cache and system memory may be respectively organized into cache pages and memory pages. Wireless devices 106 may include various wireless communication or networking interfaces known, such as Wi-Fi, Cellular 3G/4G, Bluetooth®, Near Field Communication, and so forth. Similarly, at least some of wireless devices 108 may be configured to operate in selected ones of less or more active states, e.g., an idle/sleep state and an active state (consuming different amount of power while in the different states). Other devices 108 may include wired communication or networking interfaces, such as Ethernet, Universal Serial Bus (USB), and so forth; storage devices, such as solid state, magnetic and/or optical drives; input devices, such as keyboard, mouse, touch sensitive screen, and so forth; and output devices, such as, display devices, printers, and so forth. Likewise, at least some of other devices 108 may be configured to operate in selected ones of less or more active states, e.g., an idle/sleep state and an active state (consuming different amount of power while in the different states). PMU 110 may be configured to provide power and/or regulate power provided to the various hardware components (at the different states). In embodiments, the various hardware components, in particular, wireless components 106, may have corresponding drivers (not shown) in kernel 105.

As described earlier, each of VM 130a and 130b may include a number of vCPUs 134a/134b (that are virtualization of the processor cores of processor 102) in its kernel, and applications 132a/132b operated by vCPU 134a/134b in its user space. Applications 132a and 132b may be any applications known. Each of VM 130a and 130b may further include a guest operating system (OS) (not shown) in its kernel. The guest OS may likewise be any one of a number of OS known in the art, e.g., the Windows OS from Microsoft® Corporation. Further, each guest OS may include VM performance/resource monitor 136a/136b configured to monitor performance and resource utilization metrics of corresponding VM 136a/136b, such as, but are not limited to, vCPU utilization, memory accesses, networking bandwidth consumption, and so forth. While for ease of understanding, only two VM 130a and 130b are shown in FIG. 1, the present disclosure is not limited. Computing device 100 may have any number of VMs, subject only to the performance requirements and resources available.

VMM 120 of kernel 105 may be configured to manage operation and resource allocation to the various VM 130a/130b, e.g., instantiation/spawning and consolidation of VM 130a/130b, mapping of processor cores of processor 102 to vCPU 134a/134b of VM 130a/130b, mapping of virtual addresses of VM 130a/130b to the physical addresses of memory 104, and so forth, and monitor operations of VM 130a/130b. As described earlier, VMM 120 may include, in particular, power manager 124, to manage power consumption of computing device 100, through management of operation of VM 130a/130b and power consumption of various components of hardware 101, based at least in part on the states of wireless components 106. In embodiments, power manager 124 may obtain or receive the state information of the various wireless components from their corresponding drivers. In embodiments, power manager 124 may also obtain radio configurations (e.g., antenna configuration, wake-up (or delivery traffic indication message (DTIM) beacon) interval, half/full duplex mode, etc.) and available bandwidth from the corresponding drivers. In alternate embodiments, power manager 124 may obtain at least some of the states and configuration information of wireless components 106 from wireless components 106 directly. Except for power manager 124, VMM 120 may be any one of a number of VMMs known.

Kernel 105, in addition to the earlier described VMM 120 having power manager 124, may further include platform performance/resource monitor 122 configured to gather performance and resource utilization metric data from performance/resource monitors 136a and 136b and provide the gathered data to power manager 124. In alternate embodiments, power manager 124 may obtain or receive the performance metric data from performance/resource monitors 136a and 136b directly. Regardless, power manager 124 may analyze the obtained/received data, and ascertain correlation, if any, between performance/resource usage of VM 130a/130b with states of wireless components 106, and manage VM 130a/130b including resource allocation to affect power consumption of various hardware components, which in turn affects the overall power consumption of apparatus 100, based at least in part on the states of various wireless components/devices 106 (while being mindful of the overall performance of computing device 100).

For example, power manager 124 may ascertain from the performance and resource usage metrics and wireless component state data that certain VM 130a or 130b seems to be less active requiring less resources, when a particular wireless component 106 transitions from a more active state to a less active state, such as from an active state to an idle/sleep state. Based on such determination, power manager 124 may reduce resources allocated to the particular VM, deallocate some of the previous allocated resource, on detecting the particular wireless component 106 transitioning from the more active state to the less active state. Reduction and deallocate of resource may include consolidating mapping one or more of the vCPUs of the certain VM 130a or 130b to the same processor core, allowing one or more processor cores to be deallocated, and transitioned into an idle/sleep state and/or lower operating frequency. Reduction and deallocate of resource may further include consolidating tasks allocated the VM 130a/130b, thereby allowing one or more of other VMs 130/130b to be shut down, and the previously allocated resources to the VM 130a/130b being shut down (including processor core or cores) to be deallocated, and transitioned into an idle/sleep state and/or lower operating frequency.

As a further example, the converse may also be practiced. Power manager 124 may ascertain from the performance and resource usage metrics and wireless component state data that certain VM 130a or 130b seems to be more active requiring more resources, when a particular wireless component 106 transitions from a less active state to a more active state, such as from an idle/sleep state to an active state. Based on such determination, power manager 124 may increase resources allocated to the particular VM, on detecting the particular wireless component 106 transitioning from the less active state to the more active state. Increase allocation of resource may include splitting mapping of one or more of the vCPUs of the certain VM 130a or 130b to different processor cores, in particular, previously idle/sleep or frequency lowered processor cores. The processor cores having new vCPU mapped may transition from a previous idle/sleep state to an active state, and/or have their operating frequencies increased. Increase allocation of resource may further include distributing tasks across more VMs 130a/130b, including instantiating one or more of new VMs 130/130b.

In embodiments, power manager 124 may effectuate the reduction of power consumption of the various hardware components through command/instructions issued to the drivers of the hardware components or to the hardware components directly. For example, for processor cores of processor 102, power manager 124 may effectuate the reduction of power consumption of the processor cores by commanding/instructing the processor cores to transition from an active state to an idle/sleep state, and/or to reduce their operating frequencies. In embodiments, power manager 124 may write the commands/instructions into configuration or control registers of the processor cores. In alternate embodiment s, power manager 124 may effectuate the reduction of power consumption of the various hardware components through command/instructions issued to PMU 110.

Figure 2:
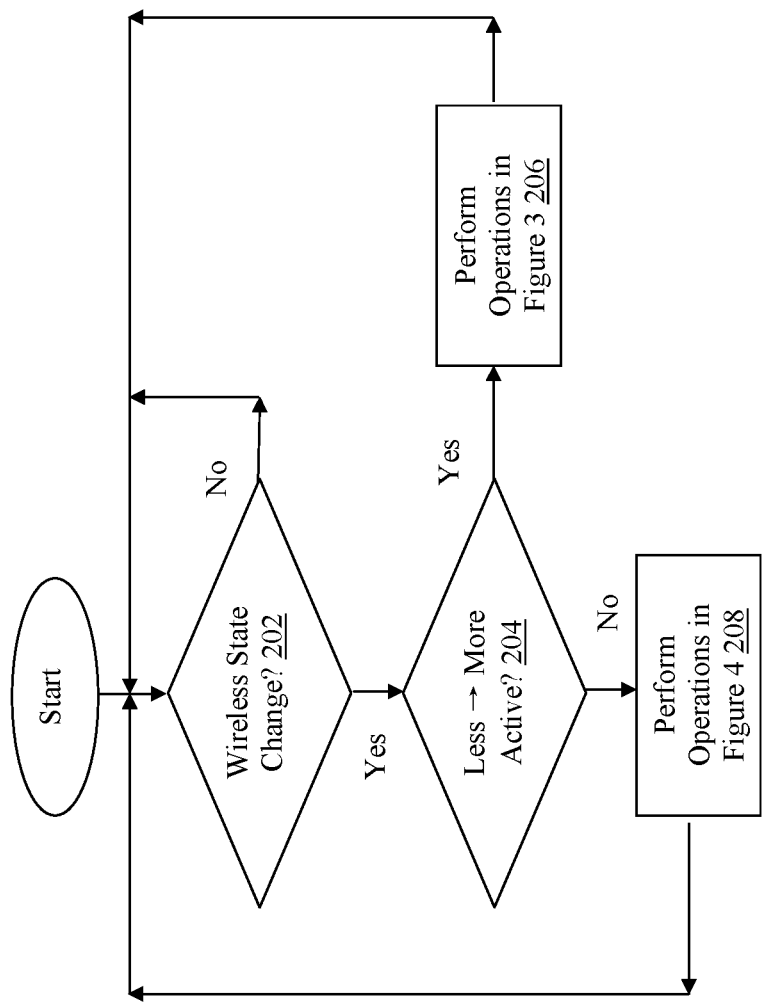
FIGS. 2-4 illustrates an example process for managing power consumption based on wireless communication component state, according to various embodiments.
Figure 4:
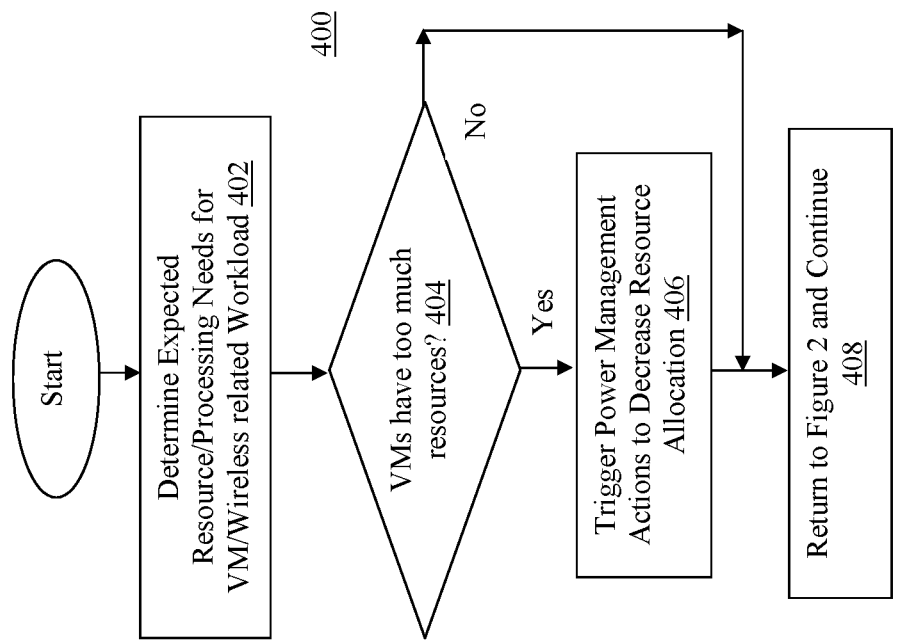
Figure 3:
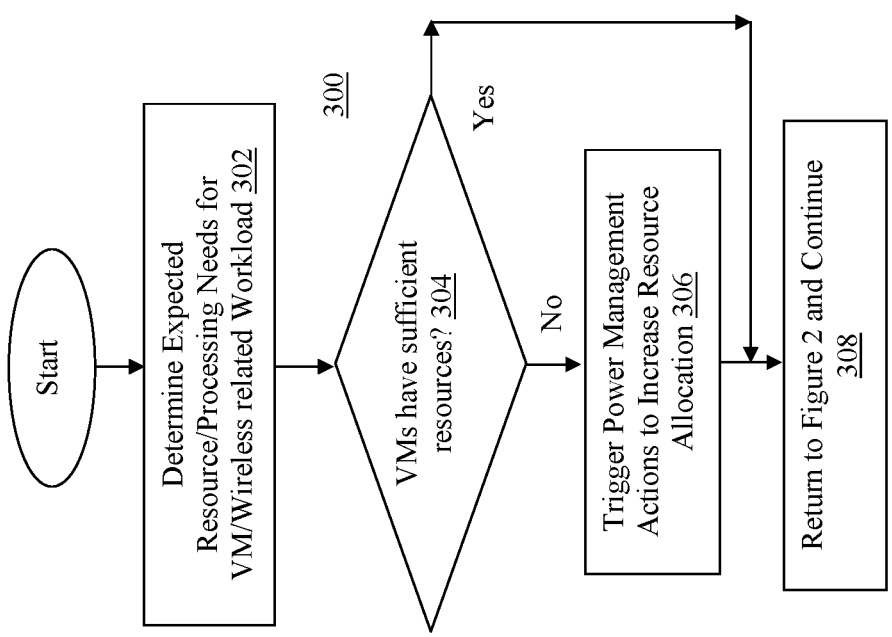

Referring now to FIGS. 2-4, wherein a process for managing power consumption by hardware components, according to some embodiments, is shown. As illustrated, process 200 for managing power consumption by hardware components may include the operations at blocks 202-210. The operations may be performed e.g., by power manager 124 of VMM 120.

Process 200 may start at block 202. At block 202, a determination may be made on whether there has been a state change in one of the wireless components. As described earlier, the current state information of the various wireless components may be obtained from the wireless components directly or for others, the current state information of the various wireless components may be obtained from their drivers. If a result of the determination indicates that there has been no change to any of the states of any of the wireless components, process 200 may remain at block 202, and repeat the determination. On the other hand, if a result of the determination indicates that there has been change to the state of at least one of the wireless components, process 200 may proceed to block 204.

At block 204, a determination may be made on whether the state of the changing wireless component has changed from a less active state to a more active state, e.g., from an idle/sleep state to an active state. If a result of the determination indicates that there has been a change from a less active state to a more active state, process 200 may proceed to block 206. Otherwise, if a result of the determination indicates that there has not been a change from a less active state to a more active state, process 200 may proceed to block 208.

At block 206, process 300 for managing power consumption in response to a less to more active state change of a wireless component may be performed, to be described more fully later with references to FIG. 3.

At block 208, process 400 for managing power consumption in response to a more to less active state change of a wireless component may be performed, to be described more fully later with references to FIG. 4.

Referring now to FIG. 3, wherein a process for managing power consumption by hardware components in response to a less to more active state change of a wireless component, according to some embodiments, is shown. As illustrated, process 300 for managing power consumption by hardware components in response to a less to more active state change of a wireless component may include the operations at blocks 302-308. The operations may be performed e.g., by power manager 124 of VMM 120.

Process 300 may start at block 302. At block 302, expected resource or processing needs for the VMs, in particular, for wireless related workloads of the VMs, for a next time period of $t_1$ time units may be determined. The size of the next time period may be application dependent, depending on the precision desired. Next at block 304, a determination may be made on whether the VMs have sufficient resources for the next time period, in view of the newly determined expected resource or processing needs for the VMs. If a result of the determination indicates that the VMs do not have sufficient resources for the next time period in view of the newly determined expected resource or processing needs for the VMs, the process may proceed to block 306. At block 306, power management actions may be triggered to manage power consumption of various hardware components. As described earlier, the power management actions may include, but are not limited to, causing VMM 120 to assign a processor core to a vCPU 134a/134b of a target VM which processes most of the wireless induced workloads and/or increase the frequency of the newly assigned processor core (including bringing the processor core into active state, if it was previously in an idle/sleep state). In other embodiments, the power management actions may also include causing VMM 120 to distribute some of the workloads of the VM to other VMs, to increase the capacity of the VM to handle the expected increase in workload.

If a result of the determination indicates that the VMs have sufficient resources in the next time period in view of the newly determined expected resource or processing needs for the VMs at block 304, or after triggering the power management actions at block 306, the process may proceed to block 308. At block 308, process 300 may return to block 206 of FIG. 2, then to block 202, and continue there from as earlier described.

Referring now to FIG. 4, wherein a process for managing power consumption by hardware components in response to a more to less active state change of a wireless component, according to some embodiments, is shown. As illustrated, process 400 for managing power consumption by hardware components in response to a more to less active state change of a wireless component may include the operations at blocks 402-408. The operations may be performed e.g., by power manager 124 of VMM 120.

Process 400 may start at block 402. At block 402, expected resource or processing needs for the VMs, in particular, for wireless related workloads of the VMs, for a next time period of $t_2$ time units may be determined. Again, the size of the next time period may be application dependent, depending on the precision desired. Further, the size of the next time period ($t_2$) used for process 400 may the same or different from the size of the next time period ($t_1$) used for process 300. Next at block 404, a determination may be made on whether the VMs have too much resource for the next time period in view of the newly determined expected resource or processing needs for the VMs. If a result of the determination indicates that the VMs have too much resource for the next time period in view of the newly determined expected resource or processing needs for the VMs, the process may proceed to block 406. At block 406, power management actions may be triggered to manage power consumption of various hardware components. As described earlier, the power management actions may include, but are not limited to, causing VMM 120 to remove mapping of a processor core to a vCPU 134a/134b of a target VM which previously processed most of the wireless induced workloads and/or decrease the frequency of the unmapped processor core (including possibly placing the unmapped processor core in an idle/sleep state). In other embodiments, the power management actions may also include causing VMM 120 to consolidate some of the workloads of the VMs, to allow the resources previously allocated to the VM be deallocated, and the amount of power consumed by these deallocated resources be reduced or eliminated.

If a result of the determination indicates that the VMs do not have too much resource in the next time period in view of the newly calculated expected resource or processing needs for the VMs at block 404, or after triggering the power management actions at block 406, the process may proceed to block 408. At block 408, process 400 may return to block 210 of FIG. 2, then to block 202, and continue there from as earlier described.

Figure 5:
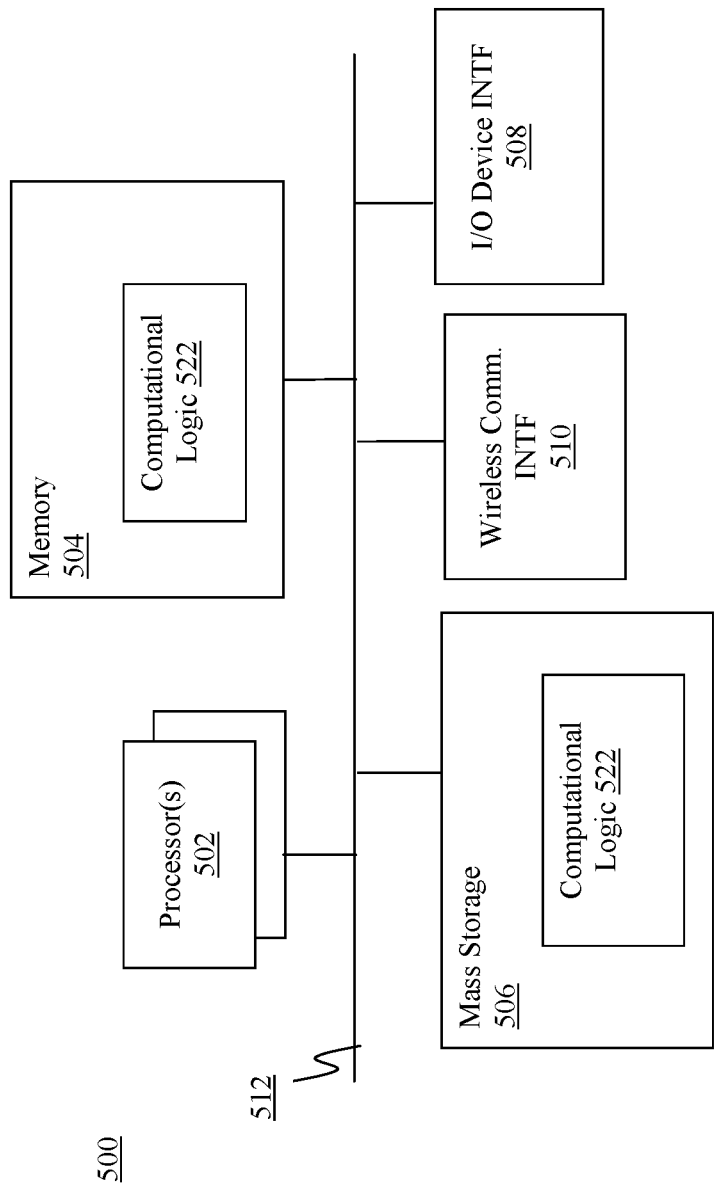
FIG. 5 illustrates an example computing device suitable for use to practice aspects of the present disclosure, according to various embodiments.

FIG. 5 illustrates an example computing device that may be suitable for use to practice selected aspects of the present disclosure. As shown, computing device 500 may include one or more processors, each with one or more processor cores 502 and system memory 504. System memory 504 may be any volatile or non-volatile memory. Additionally, computing device 500 may include mass storage devices 506. Example of mass storage devices 506 may include, but are not limited to, tape drives, hard drives, compact disc read-only memory (CD-ROM) and so forth). Further, computing device 500 may include input/output devices 508 (such as display, keyboard, cursor control and so forth) and communication interfaces 510 (such as wireless and/or wired communication/network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. As described earlier, various ones of the elements may be configured to operate in selected ones of less or active states, and/or lower or higher frequencies, consuming less or more power. System memory 504 and mass storage devices 506 may be employed to store a working copy and a permanent copy of the programming instructions implementing the operations associated with VMM 120, including power manager 124, and platform performance/resource monitor 122, as earlier described, collectively referred to as computational logic 522. Computational logic 522 may be implemented by assembler instructions supported by processor(s) 502 or high-level languages, such as, for example, C, that can be compiled into such instructions.

The number, capability and/or capacity of these elements 510-512 may vary, depending on whether computing device 500 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 510-512 are known, and accordingly will not be further described.

Figure 6:
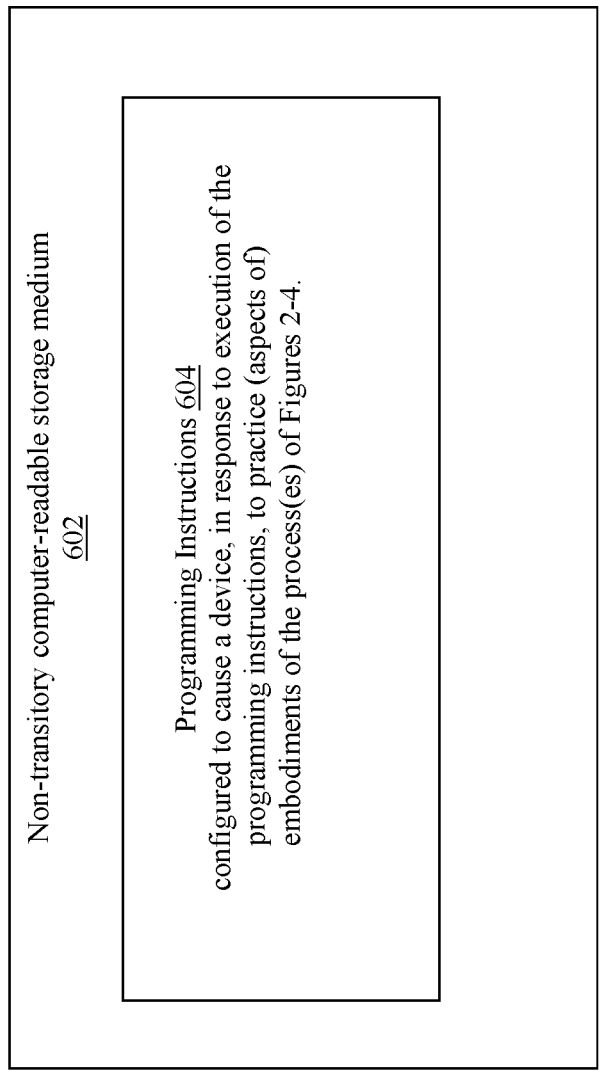
FIG. 6 illustrates a storage medium having instructions for practicing methods described with references to FIGS. 2-4, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computing device 500, in response to execution of the programming instructions, to implement (aspects of) VMM 120, including power manager 124, and platform performance/resource monitor 122, as earlier described. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502 may be packaged together with memory having aspects of power manager 124, as earlier described. For one embodiment, at least one of processors 502 may be packaged together with memory having aspects of power manager 124, to form a System in Package (SiP). For one embodiment, at least one of processors 502 may be integrated on the same die with memory having aspects of power manager 124. For one embodiment, at least one of processors 502 may be packaged together with memory having aspects of power manager 124, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, comprising: one or more processors, with each processor having one or more processor cores; one or more wireless communication components; memory coupled with the one or more processors to host a plurality of virtual machines operated by the one or more processors; and a virtual machine monitor to be loaded into the memory and operated by the one or more processors to manage operation and resource allocation to the virtual machines. The virtual machine monitor may include a power manager to manage power consumption of the apparatus, based at least in part on states of the wireless communication components.

Example 2 may be example 1, wherein the power manager may determine correlation between performance or resource usage of the virtual machines and states of the wireless communication components.

Example 3 may be example 2, wherein the power manager may obtain or receive states of the wireless communication components from drivers of the wireless communication components, or obtain or receive performance or resource usage information of the virtual machines from a platform performance and resource monitor.

Example 4 may be example 1, wherein the power manager may determine whether one or more of the plurality of virtual machines have sufficient resources for the next t time units, in response to a state change of one of the one or more wireless communication components, from a less active state to a more active state.

Example 5 may be example 4, wherein on determination that one or more of the virtual machines do not have sufficient resource for the next t time unit, the power manager may trigger one or more power management actions to provide more resources to or reduce workloads of the one or more virtual machines determined to not have sufficient resource for the next t time unit.

Example 6 may be example 5, wherein to trigger one or more power management actions may include to cause one or more tasks to be re-assigned to other virtual machine or machines from the one or more virtual machines determined to not have sufficient resource for the next t time unit.

Example 7 may be example 5, wherein to trigger one or more power management actions may include to cause one or more processor cores to be mapped to one or more virtual processors of the one or more virtual machines determined to not have sufficient resource for the next t time unit.

Example 8 may be example 7, wherein to cause one or more processor cores to be mapped may include to cause the one or more processor cores to transition from an idle or sleep state to an active state, or to increase operating frequency or frequencies of the one or more processor cores.

Example 9 may be example 1, wherein the power manager may determine whether one or more of the plurality of virtual machines have excess resource allocated for the next t time unit, in response to a state change of one of the one or more wireless communication components, from a more active state to a less active state.

Example 10 may be example 9, wherein on determination that one or more of the virtual machines have excess resource allocated for the next t time unit, the power manager may trigger one or more power management actions to reduce resources allocated to or increase workload of the one or more virtual machines determined to have excess resource for the next t time unit.

Example 11 may be example 10, wherein to trigger one or more power management actions may include to cause one or more tasks to be assigned from other virtual machine or machines to the one or more virtual machines determined to have excess resource for the next t time unit.

Example 12 may be example 10, wherein to trigger one or more power management actions may include to cause one or more processor cores to be unmapped from one or more virtual processors of the one or more virtual machines determined to have excess resource for the next t time unit.

Example 13 may be example 12, wherein to cause one or more processor cores to be unmapped may include to cause the one or more processor cores to transition to a lower power consuming state.

Example 14 may be example 13, wherein to cause the one or more processor cores to transition to a lower power consuming state may include to cause the one or more processor cores to transition from an active state to an idle or sleep state, or to decrease operating frequency or frequencies of the one or more processor cores.

Example 15 may be any one of examples 1-14, wherein the one or more wireless communication components may comprise one or more Wi-Fi, Bluetooth®, near field communication (NFC) or cellular transceivers.

Example 16 may be a method for computing, comprising: determining, with a power manager of a virtual machine monitor of a computing device, states of one or more wireless communication components of the computing device; and managing, by the power manager, power consumption of the computing apparatus, based at least in part on the states of the wireless communication components.

Example 17 may be example 16, further comprising determining, by the power manager, correlation between performance or resource usage of the virtual machines and states of the wireless communication components.

Example 18 may be example 17, further comprising obtaining or receiving, by the power manager, states of the wireless communication components from drivers of the wireless communication components, or obtaining or receiving, by the power manager, performance or resource usage information of the virtual machines from a platform performance and resource monitor.

Example 19 may be example 16, further comprising determining, by the power manager, whether one or more of the plurality of virtual machines have sufficient resources for the next t time units, in response to a state change of one of the one or more wireless communication components, from a less active state to a more active state.

Example 20 may be example 19, further comprising on determination that one or more of the virtual machines do not have sufficient resource for the next t time unit, triggering, by the power manager, one or more power management actions to provide more resources to or reduce workloads of the one or more virtual machines determined to not have sufficient resource for the next t time unit.

Example 21 may be example 20, wherein triggering one or more power management actions may include causing one or more tasks to be re-assigned to other virtual machine or machines from the one or more virtual machines determined to not have sufficient resource for the next t time unit.

Example 22 may be example 20, wherein triggering one or more power management actions may include causing one or more processor cores to be mapped to one or more virtual processors of the one or more virtual machines determined to not have sufficient resource for the next t time unit.

Example 23 may be example 22, wherein causing one or more processor cores to be mapped may include causing the one or more processor cores to transition from an idle or sleep state to an active state, or increasing operating frequency or frequencies of the one or more processor cores.

Example 24 may be example 16, further comprising determining, by the power manager, whether one or more of the plurality of virtual machines have excess resource allocated for the next t time unit, in response to a state change of one of the one or more wireless communication components, from a more active state to a less active state.

Example 25 may be example 24, further comprising on determination that one or more of the virtual machines have excess resource allocated for the next t time unit, triggering, by the power manager, one or more power management actions to reduce resources allocated to or increase workload of the one or more virtual machines determined to have excess resource for the next t time unit.

Example 26 may be example 25, wherein triggering one or more power management actions may include causing one or more tasks to be assigned from other virtual machine or machines to the one or more virtual machines determined to have excess resource for the next t time unit.

Example 27 may be example 25, wherein triggering one or more power management actions may include causing one or more processor cores to be unmapped from one or more virtual processors of the one or more virtual machines determined to have excess resource for the next t time unit.

Example 28 may be example 27, wherein causing one or more processor cores to be unmapped may include causing the one or more processor cores to transition to a lower power consuming state.

Example 29 may be example 28, wherein causing the one or more processor cores to transition to a lower power consuming state may include causing the one or more processor cores to transition from an active state to an idle or sleep state, or decreasing operating frequency or frequencies of the one or more processor cores.

Example 30 may be any one of examples 16-29, wherein the one or more wireless communication components may comprise one or more Wi-Fi, Bluetooth®, near field communication (NFC) or cellular transceivers.

Example 31 may be one or more computer-readable media comprising instructions that cause a computing device, in response to execution of the instructions by one or more processor cores of the computing device, to provide a power manager to a virtual machine monitor of the computing device to: determine states of one or more wireless communication components of the computing device; and manage power consumption of the computing device, based at least in part on the states of the wireless communication components.

Example 32 may be example 31, wherein the power manager may determine correlation between performance or resource usage of the virtual machines and states of the wireless communication components.

Example 33 may be example 32, wherein the power manager may obtain or receive states of the wireless communication components from drivers of the wireless communication components, or obtain or receive performance or resource usage information of the virtual machines from a platform performance and resource monitor.

Example 34 may be example 31, wherein the power manager may determine whether one or more of the plurality of virtual machines have sufficient resources for the next t time units, in response to a state change of one of the one or more wireless communication components, from a less active state to a more active state.

Example 35 may be example 34, wherein on determination that one or more of the virtual machines do not have sufficient resource for the next t time unit, the power manager may trigger one or more power management actions to provide more resources to or reduce workloads of the one or more virtual machines determined to not have sufficient resource for the next t time unit.

Example 36 may be example 35, wherein to trigger one or more power management actions may include to cause one or more tasks to be re-assigned to other virtual machine or machines from the one or more virtual machines determined to not have sufficient resource for the next t time unit.

Example 37 may be example 35, wherein to trigger one or more power management actions may include to cause one or more processor cores to be mapped to one or more virtual processors of the one or more virtual machines determined to not have sufficient resource for the next t time unit.

Example 38 may be example 37, wherein to cause one or more processor cores to be mapped may include to cause the one or more processor cores to transition from an idle or sleep state to an active state, or to increase operating frequency or frequencies of the one or more processor cores.

Example 39 may be example 31, wherein the power manager may determine whether one or more of the plurality of virtual machines have excess resource allocated for the next t time unit, in response to a state change of one of the one or more wireless communication components, from a more active state to a less active state.

Example 40 may be example 39, wherein on determination that one or more of the virtual machines have excess resource allocated for the next t time unit, the power manager may trigger one or more power management actions to reduce resources allocated to or increase workload of the one or more virtual machines determined to have excess resource for the next t time unit.

Example 41 may be example 40, wherein to trigger one or more power management actions may include to cause one or more tasks to be assigned from other virtual machine or machines to the one or more virtual machines determined to have excess resource for the next t time unit.

Example 42 may be example 40, wherein to trigger one or more power management actions may include to cause one or more processor cores to be unmapped from one or more virtual processors of the one or more virtual machines determined to have excess resource for the next t time unit.

Example 43 may be example 42, wherein to cause one or more processor cores to be unmapped may include to cause the one or more processor cores to transition to a lower power consuming state.

Example 44 may be example 43, wherein to cause the one or more processor cores to transition to a lower power consuming state may include to cause the one or more processor cores to transition from an active state to an idle or sleep state, or to decrease operating frequency or frequencies of the one or more processor cores.

Example 45 may be any one of examples 31-44, wherein the one or more wireless communication components may comprise one or more Wi-Fi, Bluetooth®, near field communication (NFC) or cellular transceivers.

Example 46 may be an apparatus for computing, comprising: means for determining states of one or more wireless communication components of the apparatus; and means for managing power consumption of the apparatus, based at least in part on the states of the wireless communication components.

Example 47 may be example 46, further comprising means for determining correlation between performance or resource usage of the virtual machines and states of the wireless communication components.

Example 48 may be example 47, further comprising means for obtaining or receiving states of the wireless communication components from drivers of the wireless communication components, or means for obtaining or receiving performance or resource usage information of the virtual machines from a platform performance and resource monitor.

Example 49 may be example 46, further comprising means for determining whether one or more of the plurality of virtual machines have sufficient resources for the next t time units, in response to a state change of one of the one or more wireless communication components, from a less active state to a more active state.

Example 50 may be example 49, further comprising means for, on determination that one or more of the virtual machines do not have sufficient resource for the next t time unit, triggering one or more power management actions to provide more resources to or reduce workloads of the one or more virtual machines determined to not have sufficient resource for the next t time unit.

Example 51 may be example 50, wherein means for triggering one or more power management actions may include means for causing one or more tasks to be re-assigned to other virtual machine or machines from the one or more virtual machines determined to not have sufficient resource for the next t time unit.

Example 52 may be example 50, wherein means for triggering one or more power management actions may include means for causing one or more processor cores to be mapped to one or more virtual processors of the one or more virtual machines determined to not have sufficient resource for the next t time unit.

Example 53 may be example 52, wherein means for causing one or more processor cores to be mapped may include means for causing the one or more processor cores to transition from an idle or sleep state to an active state, or increasing operating frequency or frequencies of the one or more processor cores.

Example 54 may be example 46, further comprising means for determining whether one or more of the plurality of virtual machines have excess resource allocated for the next t time unit, in response to a state change of one of the one or more wireless communication components, from a more active state to a less active state.

Example 55 may be example 54, further comprising means for, on determination that one or more of the virtual machines have excess resource allocated for the next t time unit, triggering one or more power management actions to reduce resources allocated to or increase workload of the one or more virtual machines determined to have excess resource for the next t time unit.

Example 56 may be example 55, wherein means for triggering one or more power management actions may include means for causing one or more tasks to be assigned from other virtual machine or machines to the one or more virtual machines determined to have excess resource for the next t time unit.

Example 57 may be example 55, wherein means for triggering one or more power management actions may include means for causing one or more processor cores to be unmapped from one or more virtual processors of the one or more virtual machines determined to have excess resource for the next t time unit.

Example 58 may be example 57, wherein causing one or more processor cores to be unmapped may include causing the one or more processor cores to transition to a lower power consuming state.

Example 59 may be example 58, wherein means for causing the one or more processor cores to transition to a lower power consuming state may include means for causing the one or more processor cores to transition from an active state to an idle or sleep state, or means for decreasing operating frequency or frequencies of the one or more processor cores.

Example 60 may be any one of examples 46-59, wherein the one or more wireless communication components may comprise one or more Wi-Fi, Bluetooth®, near field communication (NFC) or cellular transceivers.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more processors, with each processor having one or more processor cores;
one or more wireless communication components;
memory coupled with the one or more processors to host a plurality of virtual machines operated by the one or more processors; and
a virtual machine monitor to be loaded into the memory and operated by the one or more processors to manage operation and resource allocation to the virtual machines;
wherein the virtual machine monitor includes a power manager to manage power consumption of the apparatus, via one or more power management actions to adjust provision of resources to, or to adjust workloads of, the plurality of virtual machines, based at least in part on states of the wireless communication components.

2. The apparatus of claim 1, wherein the power manager is to determine correlation between performance or resource usage of the virtual machines and states of the wireless communication components.

3. The apparatus of claim 2, wherein the power manager is to obtain or receive states of the wireless communication components from drivers of the wireless communication components, or obtain or receive performance or resource usage information of the virtual machines from a platform performance and resource monitor.

4. The apparatus of claim 1, wherein the power manager is to determine whether one or more of the plurality of virtual machines have sufficient resources for next t time units, in response to a state change of one of the one or more wireless communication components, from a less active state to a more active state.

5. The apparatus of claim 4, wherein on determination that one or more of the virtual machines do not have sufficient resources for the next t time unit, the power manager is to trigger one or more power management actions to provide more resources to or reduce workloads of the one or more virtual machines determined to not have sufficient resources for the next t time unit.

6. The apparatus of claim 5, wherein to trigger one or more power management actions includes to cause one or more tasks to be re-assigned to another virtual machine or machines from the one or more virtual machines determined to not have sufficient resources for the next t time unit.

7. The apparatus of claim 5, wherein to trigger one or more power management actions includes to cause one or more processor cores to be mapped to one or more virtual processors of the one or more virtual machines determined to not have sufficient resources for the next t time unit.

8. The apparatus of claim 7, wherein to cause one or more processor cores to be mapped includes to cause the one or more processor cores to transition from an idle or sleep state to an active state, or to increase operating frequency or frequencies of the one or more processor cores.

9. The apparatus of claim 1, wherein the power manager is to determine whether one or more of the plurality of virtual machines have excess resources allocated for a next t time unit, in response to a state change of one of the one or more wireless communication components, from a more active state to a less active state.

10. The apparatus of claim 9, wherein on determination that one or more of the virtual machines have excess resources allocated for the next t time unit, the power manager is to trigger one or more power management actions to reduce resources allocated to or increase workload of the one or more virtual machines determined to have excess resource for the next t time unit.

11. The apparatus of claim 10, wherein to trigger one or more power management actions include to cause one or more tasks to be assigned from another virtual machine or machines to the one or more virtual machines determined to have excess resources for the next t time unit.

12. The apparatus of claim 10, wherein to trigger one or more power management actions includes to cause one or more processor cores to be unmapped from one or more virtual processors of the one or more virtual machines determined to have excess resources for the next t time unit.

13. The apparatus of claim 12, wherein to cause one or more processor cores to be unmapped includes to cause the one or more processor cores to transition to a lower power consuming state.

14. The apparatus of claim 13, wherein to cause the one or more processor cores to transition to a lower power consuming state includes to cause the one or more processor cores to transition from an active state to an idle or sleep state, or to decrease operating frequency or frequencies of the one or more processor cores.

15. The apparatus of claim 1, wherein the one or more wireless communication components comprise one or more Wi-Fi, Bluetooth®, near field communication (NFC) or cellular transceivers.

16. A method for computing, comprising:
 determining, with a power manager of a virtual machine monitor of a computing device, states of one or more wireless communication components of the computing device; and
 managing, by the power manager, power consumption of the computing device, based at least in part on the states of the wireless communication components,
via one or more power management actions to adjust provision of resources to, or to adjust workloads of, one or more virtual machines.

17. The method of claim 16, further comprising determining, by the power manager, correlation between performance or resource usage of the virtual machines and states of the wireless communication components; and obtaining or receiving, by the power manager, states of the wireless communication components from drivers of the wireless communication components, or obtaining or receiving, by the power manager, performance or resource usage information of the virtual machines from a platform performance and resource monitor.

18. The method of claim 16, further comprising determining, by the power manager, whether one or more of the plurality of virtual machines have sufficient resources for next t time units, in response to a state change of one of the one or more wireless communication components, from a less active state to a more active state; and on determination that one or more of the virtual machines do not have sufficient resources for next t time unit, triggering, by the power manager, one or more power management actions to provide more resources to or reduce workloads of the one or more virtual machines determined to not have sufficient resources for the next t time unit.

19. The method of claim 16, further comprising determining, by the power manager, whether one or more of the plurality of virtual machines have excess resources allocated for a next t time unit, in response to a state change of one of the one or more wireless communication components, from a more active state to a less active state; and on determination that one or more of the virtual machines have excess resources allocated for the next t time unit, triggering, by the power manager, one or more power management actions to reduce resources allocated to or increase workload of the one or more virtual machines determined to have excess resource for the next t time unit.

20. One or more non-transitory computer-readable media comprising instructions that cause a computing device, in response to execution of the instructions by one or more processor cores of the computing device, to provide a power manager to a virtual machine monitor of the computing device to:
 determine states of one or more wireless communication components of the computing device; and
 manage power consumption of the computing device, based at least in part on the states of the wireless communication components, via one or more power management actions to adjust provision of resources to, or to adjust workloads of, one or more virtual machines.

21. The one or more non-transitory computer-readable media of claim 20, wherein the power manager is to determine correlation between performance or resource usage of the virtual machines and states of the wireless communication components; wherein the power manager is to obtain or receive states of the wireless communication components from drivers of the wireless communication components, or obtain or receive performance or resource usage information of the virtual machines from a platform performance and resource monitor.

22. The one or more non-transitory computer-readable media of claim 20, wherein the power manager is to determine whether one or more of the plurality of virtual machines have sufficient resources for next t time units, in response to a state change of one of the one or more wireless communication components, from a less active state to a more active state; wherein on determination that one or more of the virtual machines do not have sufficient resources for the next t time unit, the power manager is to trigger one or more power management actions to provide more resources to or reduce workloads of the one or more virtual machines determined to not have sufficient resources for the next t time unit.

23. The one or more non-transitory computer-readable media of claim 22, wherein to trigger one or more power management actions include to cause one or more tasks to be re-assigned to another virtual machine or machines from the one or more virtual machines determined to not have sufficient resources for the next t time unit; or wherein to trigger one or more power management actions includes to cause one or more processor cores to be mapped to one or more virtual processors of the one or more virtual machines determined to not have sufficient resources for the next t time unit.

24. The one or more non-transitory computer-readable media of claim 20, wherein the power manager is to determine whether one or more of the plurality of virtual machines have excess resources allocated for a next t time unit, in response to a state change of one of the one or more wireless communication components, from a more active state to a less active state; wherein on determination that one or more of the virtual machines have excess resources allocated for the next t time unit, the power manager is to trigger one or more power management actions to reduce resources allocated to or increase workload of the one or more virtual machines determined to have excess resources for the next t time unit.

25. The one or more non-transitory computer-readable media of claim 24, wherein to trigger one or more power management actions include to cause one or more tasks to be assigned from another virtual machine or machines to the one or more virtual machines determined to have excess resources for the next t time unit; or wherein to trigger one or more power management actions includes to cause one or more processor cores to be unmapped from one or more virtual processors of the one or more virtual machines determined to have excess resource for the next t time unit.

* * * * *